United States Patent
Yu et al.

(10) Patent No.: US 12,441,868 B2
(45) Date of Patent: Oct. 14, 2025

(54) POLYOLEFIN FORMULATION

(71) Applicants: Dow Global Technologies LLC, Midland, MI (US); Rohm and Haas Company, Collegeville, PA (US)

(72) Inventors: Xindi Yu, Paoli, PA (US); Paul M. Mwasame, Royersford, PA (US); Decai Yu, Midland, MI (US); Sukrit Mukhopadhyay, Midland, MI (US); Yuanqiao Rao, Berwyn, PA (US); Timothy J. Person, Pottstown, PA (US); Dachao Li, Shanghai (CN); Junsi Gu, Malvern, PA (US); Jeffrey M. Cogen, Flemington, NJ (US)

(73) Assignees: Dow Global Technlogies LLC, Midland, MI (US); Rohm and Haas Company, Collegeville, PA (US)

( * ) Notice: Subject to any disclaimer, the term of this patent is extended or adjusted under 35 U.S.C. 154(b) by 312 days.

(21) Appl. No.: 18/043,793

(22) PCT Filed: Oct. 25, 2021

(86) PCT No.: PCT/US2021/056438
§ 371 (c)(1),
(2) Date: Mar. 2, 2023

(87) PCT Pub. No.: WO2022/093682
PCT Pub. Date: May 5, 2022

(65) Prior Publication Data
US 2023/0265264 A1    Aug. 24, 2023

Related U.S. Application Data

(60) Provisional application No. 63/107,894, filed on Oct. 30, 2020.

(51) Int. Cl.
*C08K 5/07* (2006.01)
*B32B 15/085* (2006.01)
(Continued)

(52) U.S. Cl.
CPC ............. *C08K 5/07* (2013.01); *B32B 27/20* (2013.01); *B32B 27/32* (2013.01); *C09D 123/06* (2013.01);
(Continued)

(58) Field of Classification Search
None
See application file for complete search history.

(56) References Cited

U.S. PATENT DOCUMENTS 3,482,033 A    12/1969  Kenney et al.
3,830,764 A    8/1974   Hudgin et al.
(Continued)

FOREIGN PATENT DOCUMENTS

EP    0111043    6/1984
EP    2886595    6/2015
(Continued)

OTHER PUBLICATIONS

Yamano—electrical_breakdown_in_LDPE_by_polycyclic_ compounds—amounts—effect of conc.—2009 (Year: 2009).*
(Continued)

*Primary Examiner* — John Vincent Lawler

(57) ABSTRACT

A crosslinkable polyolefin formulation comprises (A) a polyethylene polymer and (B) an arylketone of formula (I) as defined herein; products made therefrom; methods of making and using same; and articles containing same.

6 Claims, 1 Drawing Sheet

(51) Int. Cl.
*B32B 15/20* (2006.01)
*B32B 27/20* (2006.01)
*B32B 27/32* (2006.01)
*C09D 123/06* (2006.01)
*H01B 3/44* (2006.01)

(52) U.S. Cl.
CPC ............ *H01B 3/441* (2013.01); *B32B 15/085* (2013.01); *B32B 15/20* (2013.01); *B32B 2270/00* (2013.01); *B32B 2307/202* (2013.01); *B32B 2307/206* (2013.01)

(56) References Cited

U.S. PATENT DOCUMENTS

| | | | |
|---|---|---|---|
| 3,933,772 A * | 1/1976 | Takahashi | C08K 5/01 526/348 |
| 3,941,759 A | 3/1976 | Taylor et al. | |
| 3,981,856 A | 9/1976 | Hudgin et al. | |
| 4,018,852 A | 4/1977 | Schober | |
| 4,495,311 A | 1/1985 | Hudgin et al. | |
| 5,246,783 A | 9/1993 | Spenadel et al. | |
| 5,346,961 A | 9/1994 | Shaw et al. | |
| 6,404,971 B2 | 6/2002 | Mehl | |
| 6,496,629 B2 | 12/2002 | Ma et al. | |
| 6,696,154 B2 | 2/2004 | Martinotto et al. | |
| 6,714,707 B2 | 3/2004 | Rossi et al. | |
| 7,351,744 B2 | 4/2008 | Henderson et al. | |
| 8,680,399 B2 | 3/2014 | Eaton | |
| 9,133,320 B2 | 9/2015 | Englund et al. | |
| 9,343,198 B2 * | 5/2016 | Hjertberg | H01B 3/441 |
| 2015/0267036 A1 | 9/2015 | Cree | |
| 2016/0096950 A1 | 4/2016 | Tomer et al. | |
| 2016/0276061 A1 | 9/2016 | Person | |
| 2016/0304699 A1 | 10/2016 | Jarvid et al. | |
| 2016/0312007 A1 | 10/2016 | Wutzel et al. | |
| 2019/0233627 A1 | 8/2019 | Hagstrand et al. | |
| 2020/0115477 A1* | 4/2020 | Smedberg | C08F 210/02 |

FOREIGN PATENT DOCUMENTS

| | | |
|---|---|---|
| GB | 1461331 | 1/1977 |
| WO | 2010028721 | 3/2010 |
| WO | 2001008166 | 1/2011 |
| WO | 2012044521 | 4/2012 |
| WO | 2014172107 | 10/2014 |
| WO | 2014209661 | 12/2014 |

OTHER PUBLICATIONS

Zhang—electrical breakdown polyethylene+aromatic carbonyl compound—PCT D1—J.Mol.Mod., 2013 (Year: 2013).*

Chen, "Electrical Treeing Characteristics in XLPE Power Cable Insulation in Frequency Range between 20 and 500 Hz" 2009, vol. 16, No. 1, p. 179-188.

Czaszejko, "High-Voltage Testing Fundamentals: A Cable Testing Perspective" vol. 30, No. 1, p. 7-13.

Mason, "Breakdown of Solid Dielectrics in Divergent Fields" 1955, vol. 102, p. 254-263.

Mcmahon, "A Tutorial on Treeing" 1978, vol. EI-13, No. 4, p. 277-288.

Olyphant, "Breakdown by Treeing in Epoxy Resins", 1963, vol. 82, p. 1106-1112.

Yoshimura, "Comparison of Single and Double Needle Tests for Evaluation of Resistance to Treeing Breakdown" 1983, vol. EI-18, No. 1, p. 42-47.

Zhang, "Mechanisms on electrical breakdown strength increment of polyethylene by aromatic carbonyl compounds addition: a theoretical study", J. Molecular Modeling, 2013, vol. 19, No. 12, pp. 5429-5438.

PCT/US2021/056438, International Search Report and Written Opinion with a mailing date of Jan. 25, 2022.

* cited by examiner

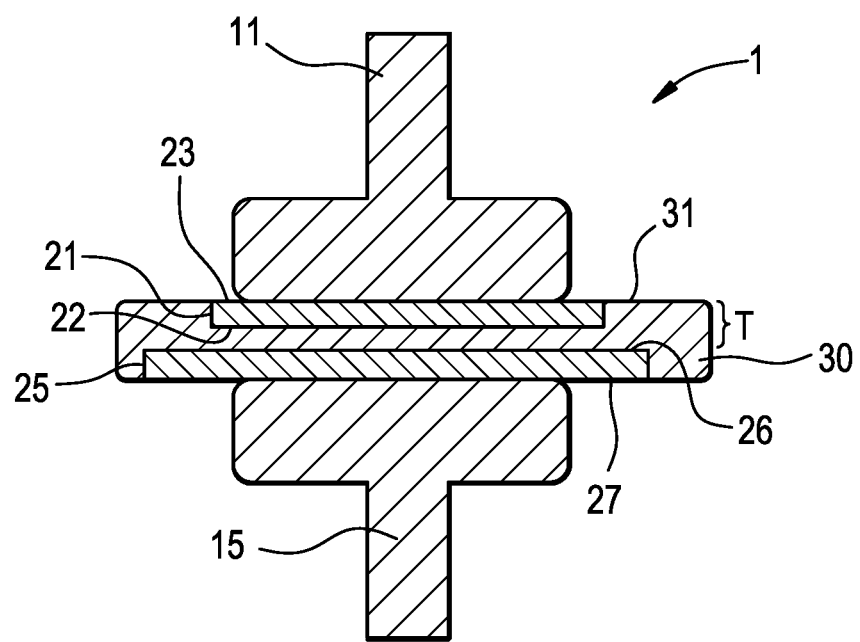

POLYOLEFIN FORMULATION

Patents and patent application publications in the field include EP0111043A1; EP2886595; GB1461331A; U.S. Pat. Nos. 3,482,033; 3,941,759; 3,981,856; 4,495,311; 6,696,154B2; 7,351,744B2; 8,680,399B2; 9,133,320B2; 9,343,198B2; US2015/0267036A1; US20160096950A1; US20160276061A1; US20160304699A1; US20160312007A1; US20190233627A1; US2020/0115477A1; WO2001008166; WO2010028721A1; WO2012044521; WO2014172107A1; and WO2014209661A1.

INTRODUCTION

US 2016/0304699 A1 to Markus Jarvid, et al. and U.S. Pat. No. 9,133,320 B2 to Villgot Englund et al. mention polyolefin compositions for medium/high/extra high voltage cables comprising benzil-type voltage stabiliser.

Insulated electrical conductors typically comprise a conductive core covered by an insulation layer. The conductive core may be solid or stranded (e.g., a bundle of wires). Some insulated electrical conductors may also contain one or more additional elements such as semiconducting layer(s) and/or a protective jacket (e.g., wound wire, tape, or sheath). Examples are coated metal wires and electrical power cables, including those for use in low voltage ("LV", >0 to <5 kilovolts (kV)), medium voltage ("MV", 5 to <69 kV), high voltage ("HV", 69 to 230 kV) and extra-high voltage ("EHV", >230 kV) power cables and their electricity-transmitting/distributing applications. Evaluations of power cables may use AEIC/ICEA specifications and standards and/or IEC test methods.

SUMMARY

We recognized that a majority of high voltage power cables contain an insulation layer composed of an insulation material that comprises a host polymer and one or more additives, such as one or more antioxidants, a colorant, and a hindered amine stabilizer. Electrical breakdown strength (also known as dielectric strength) of the insulation material determines how thick the insulation layer needs to be to satisfy industry specifications for performance of power cables at a particular voltage. All other things being equal, an insulation material having a higher electrical breakdown strength allows for a thinner insulation layer, and thus a thinner cable, with the same electrical breakdown strength. The thinner cable beneficially allows using a lesser amount of cable mass per unit cable length for achieving a given electrical breakdown strength. In turn this helpfully increases the length of cable that can be wound onto a standard-size cable roll. The longer cables in turn decrease the number of joints or splices needed to connect two or more thinner cables together. Alternatively, the insulation material having a higher electrical breakdown strength allows for an insulation layer with the same thickness, and thus a cable of same thickness, but greater electrical breakdown strength. The same thickness cable having higher electrical breakdown strength advantageously allows higher voltage to be carried in that cable geometry. Transmitting electrical power at higher voltage reduces energy loss.

We have discovered a genus of arylketones with beneficial voltage stabilizing efficacy. When a host polyolefin polymer is formulated with one or more of these arylketones, the resulting crosslinkable polyolefin formulation has increased electrical breakdown strength versus that of host polyolefin without the (B) arylketone. In some embodiments the electrical breakdown strength of the inventive formulation is advantageously greater than that of a comparative formulation containing benzil and/or a benzil derivative. We contemplate the following embodiments.

A crosslinkable polyolefin formulation comprising (A) a polyethylene polymer and (B) an arylketone of formula (I):

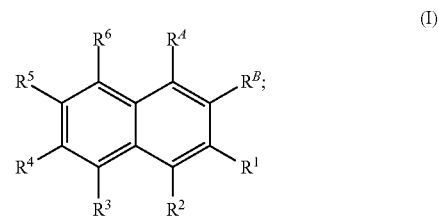

wherein each of $R^1$ to $R^6$ is a hydrogen atom (H); or wherein $R^1$ and $R^2$, or $R^3$ and $R^4$, or $R^4$ and $R^5$, or $R^5$ and $R^6$, are bonded together with the carbon atoms in formula (I) to which they are bonded to form a fused 6-membered aryl ring and each of the remaining four of $R^1$ to $R^6$ is H; or wherein $R^2$, $R^3$, and $R^4$ are bonded together in such a way with the carbon atoms in formula (I) to which they are bonded and the closest bridgehead carbon atom in formula (I) to form two fused 6-membered aryl rings and each of $R^1$ $R^5$, and $R^6$ are H; and wherein one of $R^A$ and $R^B$ is a group of formula —C(=O)—$R^7$ and the other of $R^A$ and $R^B$ is H, or wherein $R^A$ is a group of formula —C(=O)—$R^7$ and $R^B$ and $R^1$ are bonded together with the carbon atoms in formula (I) to which they are bonded to form a fused 6-membered aryl ring and $R^2$ to $R^6$ are as defined above; wherein $R^7$ is an unsubstituted ($C_1$-$C_{40}$)alkyl group.

A method of making the crosslinkable polyolefin formulation, the method comprising contacting the (A) polyethylene polymer with the (B) arylketone of formula (I) in such a way so as to make the formulation.

A method of making a crosslinked polyolefin product, the method comprising subjecting the formulation to a curing condition in such a way so as to crosslink the (A) polyethylene polymer, thereby making the crosslinked polyolefin product.

A crosslinked polyolefin product made by the above method.

A manufactured article comprising the crosslinkable polyolefin formulation and/or the crosslinked polymer product.

An electrical breakdown strength test method as described later.

BRIEF DESCRIPTION OF THE DRAWING(S)

FIG. 1 (FIG. 1) is a drawing of a geometry of a test sample for measuring electrical breakdown strength.

DETAILED DESCRIPTION

The Summary and Abstract are incorporated here by reference. Embodiments follow, some of which are described as numbered aspects for easy reference.

Aspect 1. A crosslinkable polyolefin formulation comprising (A) a polyethylene polymer and (B) an arylketone of formula (I):

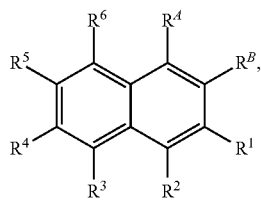

(I)

wherein each of $R^1$ to $R^6$ is a hydrogen atom (H); or wherein $R^1$ and $R^2$, or $R^3$ and $R^4$, or $R^4$ and $R^5$, or $R^5$ and $R^6$, are bonded together with the carbon atoms in formula (I) to which they are bonded to form a fused 6-membered aryl ring and each of the remaining four of $R^1$ to $R^6$ is H; or wherein $R^2$, $R^3$, and $R^4$ are bonded together in such a way with the carbon atoms in formula (I) to which they are bonded and the closest bridgehead carbon atom in formula (I) to form two fused 6-membered aryl rings and each of $R^1$ $R^5$, and $R^6$ are H; and wherein one of $R^A$ and $R^B$ is a group of formula —C(=O)—$R^7$ and the other of $R^A$ and $R^B$ is H, or wherein $R^A$ is a group of formula —C(=O)—$R^7$ and $R^B$ and $R^1$ are bonded together with the carbon atoms in formula (I) to which they are bonded to form a fused 6-membered aryl ring and $R^2$ to $R^6$ are as defined above; wherein $R^7$ is an unsubstituted $(C_1$-$C_{40})$alkyl group; wherein the (A) polyethylene polymer comprises from 51 to 100 weight percent (wt %) ethylene-derived constituent units and from 49 to 0 wt %, respectively, of alpha-olefin-derived constituent units, based on weight of the (A) polyethylene polymer; and wherein the crosslinkable polyolefin formulation comprises from 30.0 to 99.9 wt % of the (A) polyethylene polymer based on total weight of the crosslinkable polyolefin formulation and from 0.1 to 3.0 wt % of the (B) arylketone based on total weight of the crosslinkable polyolefin formulation. The crosslinkable polyolefin formulation may further comprise 0, 1, 2, 3, or more optional additives, which comprise or consist of additives (C) to (M) described below. The total weight of the crosslinkable polyolefin formulation comprising constituents (A), (B), and any optional additives is 100.0 wt %. The crosslinkable polyolefin formulation has increased electrical breakdown strength versus that of a crosslinked (A) polyethylene polymer that is free of the (B) arylketone. The (A) polyethylene polymer may be any one of the embodiments thereof described in aspect 6 below or described later in the section "The (A) polyethylene polymer".

Aspect 2. The crosslinkable polyolefin formulation of aspect 1 wherein the (B) arylketone is an arylketone of formula (Ia) or (Ib):

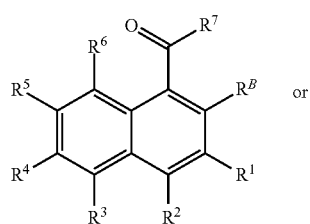

(Ia)

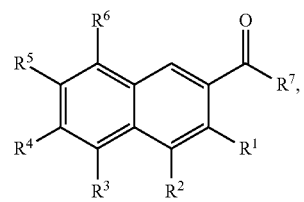

(Ib)

wherein $R^1$ to $R^7$ and $R^B$ are independently as defined for formula (I). In some aspects the (B) arylketone is of formula (Ia); alternatively the (B) arylketone is of formula (Ib). In some aspects of formula (Ia), each of $R^1$ to $R^6$ and $R^B$ is H. In some aspects of formula (Ia), $R^1$ and $R^2$, or $R^3$ and $R^4$, or $R^4$ and $R^5$, or $R^5$ and $R^6$, are bonded together with the carbon atoms in formula (Ia) to which they are bonded to form a fused 6-membered aryl ring and each of the remaining four of $R^1$ to $R^6$ is H and $R^B$ is H. In some aspects of formula (Ia), $R^2$, $R^3$, and $R^4$ are bonded together in such a way with the carbon atoms in formula (Ia) to which they are bonded and the closest bridgehead carbon atom in formula (Ia) to form two fused 6-membered aryl rings and each of $R^1$ $R^5$, and $R^6$ is H and $R^B$ is H. In some aspects of formula (Ia), $R^B$ and $R^1$ are bonded together with the carbon atoms in formula (Ia) to which they are bonded to form a fused 6-membered aryl ring and $R^2$ to $R^6$ are H. In some aspects of formula (Ib), each of $R^1$ to $R^6$ is H. In some aspects of formula (Ib), $R^1$ and $R^2$, or $R^3$ and $R^4$, or $R^4$ and $R^5$, or $R^5$ and $R^6$, are bonded together with the carbon atoms in formula (Ib) to which they are bonded to form a fused 6-membered aryl ring and each of the remaining four of $R^1$ to $R^6$ is H. In some aspects of formula (Ib), $R^2$, $R^3$, and $R^4$ are bonded together in such a way with the carbon atoms in formula (Ib) to which they are bonded and the closest bridgehead carbon atom in formula (Ib) to form two fused 6-membered aryl rings and each of $R^1$ $R^5$, and $R^6$ are H. In the foregoing aspects of formulas (Ia) and (Ib), each $R^7$ independently is the unsubstituted $(C_1$-$C_{40})$alkyl group.

Aspect 3. The crosslinkable polyolefin formulation of aspect 1 or 2 wherein the (B) arylketone is an arylketone of formula (Ia-1), (Ia-2), or (Ia-3):

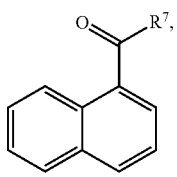

(Ia-1)

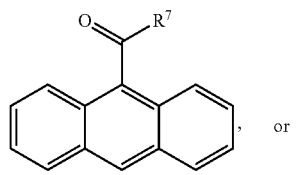

(Ia-2)

-continued

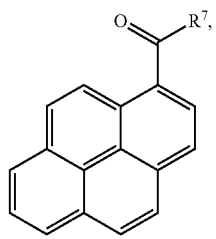

(Ia-3)

wherein each $R^7$ independently is as defined for formula (I). In some embodiments the (B) arylketone is of formula (Ia-1) or (Ia-2); alternatively the (B) arylketone is of formula (Ia-1) or (Ia-3); alternatively the (B) arylketone is of formula (Ia-2) or (Ia-3); alternatively the (B) arylketone is of formula (Ia-1); alternatively the (B) arylketone is of formula (Ia-2); alternatively the (B) arylketone is of formula (Ia-3).

Aspect 4. The crosslinkable polyolefin formulation of aspect 1 or 2 wherein the (B) arylketone is an arylketone of formula (Ib-1):

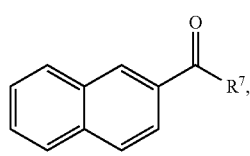

(Ib-1)

wherein $R^7$ independently is as defined for formula (I).

Aspect 5. The crosslinkable polyolefin formulation of any one of aspects 1 to 4 wherein $R^7$ is an unsubstituted $(C_1-C_5)$alkyl group or an unsubstituted $(C_6-C_{40})$alkyl group. In some embodiments $R^7$ is the unsubstituted $(C_1-C_5)$alkyl group. In some embodiments $R^7$ is methyl or ethyl. In some embodiments $R^7$ is methyl (i.e., $CH_3$).

Aspect 6. The crosslinkable polyolefin formulation of any one of aspects 1 to 5 wherein the (A) polyethylene polymer comprises 100 wt % of ethylene-derived constituent units and is (A1) a low-density polyethylene homopolymer (LDPE); or wherein the (A) polyethylene polymer comprises from 51 to 99.9 wt % ethylene-derived constituent units and from 49 to 0.1 wt % alpha-olefin-derived constituent units and is (A2) an ethylene/alpha-olefin copolymer. The (A2) ethylene/alpha-olefin copolymer may be an ethylene/1-butene copolymer, an ethylene/1-hexene copolymer, an ethylene/1-octene copolymer, or a blend of any two thereof. In some aspects the (A) polyethylene polymer is the (A2) ethylene/alpha-olefin copolymer that is the ethylene/1-butene copolymer; alternatively the (A2) is the ethylene/1-hexene copolymer. In some aspects the (A) polyethylene polymer consists of a low-density polyethylene (LDPE) polymer. The LDPE polymer is made by polymerizing ethylene in a high pressure reactor in the absence of a metal-based polymerization catalyst and in the presence of a small amount of a free radical initiator (e.g., a peroxide or $O_2$) and a chain transfer agent (CTA). The CTA may be propylene, which may be used at 1 wt % relative to the total weight of ethylene and propylene in the high pressure reactor. The LDPE polymer may have a density of from 0.910 to 0.930 g/cm$^3$ and a melt index (I2) of from 1.0 to 5 g/10 min. The LDPE polymer may be LDPE-1 described in the Examples.

Aspect 7. The crosslinkable polyolefin formulation of any one of aspects 1 to 6 further comprising at least one additive wherein each additive is independently selected from the group consisting of: (C) an organic peroxide; (D) an anti-scorch agent; (E) an antioxidant; (F) a filler; (G) a flame retardant; (H) a hindered amine stabilizer; (I) a tree retardant; (J) a methyl radical scavenger; (K) a crosslinking coagent; (L) a nucleating agent; (M) a colorant (e.g., carbon black or titanium dioxide); and a combination of any two or more of additives (C) to (M). The total weight of the crosslinkable polyolefin formulation comprising constituents (A), (B), and the at least one additive (C) to (M) is 100.0 wt %. In some embodiments the crosslinkable polyolefin formulation further comprises the (C) organic peroxide and (E) antioxidant; alternatively the crosslinkable polyolefin formulation further comprises the (C) organic peroxide, (E) antioxidant, and (K) crosslinking coagent; alternatively the crosslinkable polyolefin formulation further comprises the (C) organic peroxide, (E) antioxidant, and (M) colorant; alternatively the crosslinkable polyolefin formulation further comprises the (C) organic peroxide, (E) antioxidant, (K) crosslinking coagent, and (M) colorant. In some embodiments the crosslinkable polyolefin formulation consists of constituents (A), (B), and one or more additives selected from constituents (C) to (M). In some embodiments the at least one additive is selected from the group consisting of all but one of constituents (C) to (M) (i.e., one of (C) to (M) is omitted from the group). The total amount of the one or more additives (C) to (M) may be from 0.1 to 69 wt %, alternatively from 0.1 to 20 wt %, alternatively from 0.1 to 10 wt %, alternatively from 0.1 to 5.0 wt %, of the crosslinkable polyolefin formulation and the total amount of constituents (A) and (B) may be from 99.9 to 31 wt %, alternatively from 99.9 to 80 wt %, alternatively from 99.9 to 90 wt %, alternatively from 99.9 to 95.0 wt % of the crosslinkable polyolefin formulation, respectively. In some aspects the crosslinkable polyolefin formulation is any one of inventive examples described later. The crosslinkable polyolefin formulation has increased electrical breakdown strength versus that of a crosslinked (A) polyethylene polymer that is free of the (B) arylketone. In some embodiments the crosslinkable polyolefin formulation comprises the (C) organic peroxide.

Aspect 8. A method of making the crosslinkable polyolefin formulation of any one of aspects 1 to 7, the method comprising contacting the (A) polyethylene polymer and the (B) arylketone of formula (I) together in such a way so as to make the formulation. The formulation may be a non-uniform or uniform blend of constituents (A) and (B). The contacting step comprises bringing constituents (A) and (B) into contact with each other (from before they were previously not in contact). The contacting step may further comprise mixing the contacted (A) and (B) together to form the uniform mixture thereof. In some embodiments the method further comprises mixing at least one of the optional additives (C) to (M) with (A) and (B). The mixing may comprise melt blending constituent (B) and optionally one or more of additives (C) to (M) into a melt of constituent (A). The melt blending may be performed in an extruder configured for melting mixing polyolefins and additives. The resulting melt blend may be extruded through a die in to form a strand that is then pelletized to give the crosslinkable polyolefin formulation in the form of pellets. Or the melt blend may be extruded through a die designed to form the manufactured article comprising the crosslinkable polyolefin formulation.

Aspect 9. A method of making a crosslinked polyolefin product, the method comprising subjecting the crosslinkable polyolefin formulation of any one of aspects 1 to 7, or made by the method of aspect 8, to a curing condition in such a way so as to crosslink the (A) polyethylene polymer, thereby making the crosslinked polyolefin product. The curing condition may comprise exposing the formulation to ultraviolet light or heating the formulation with the (C) organic peroxide and, optionally, the (K) crosslinking coagent. Embodiments of the method may comprise heating an embodiment of the crosslinkable polyolefin formulation of any one of aspects 1 to 7 that comprises the (C) organic peroxide and, optionally, the (K) crosslinking coagent, in such a way so as to crosslink the (A) polyethylene polymer, thereby making a crosslinked polyolefin product. When the (K) crosslinking coagent is not used, the crosslinking comprises generating covalent carbon-carbon bonds between molecules of the (A) polyolefin polymer. When the (K) crosslinking coagent is included, the crosslinking comprises generating covalent carbon-carbon bonds between molecules of the (A) polyolefin polymer and generating covalent carbon-carbon bonds between molecules of the (K) crosslinking coagent and molecules of the (A) polyolefin polymer.

Aspect 10. A crosslinked polyolefin product made by the method of aspect 9. The crosslinked polyolefin product has increased electrical breakdown strength versus that of a crosslinked (A) polyethylene polymer that is free of the (B) arylketone. The crosslinked polyolefin product may comprise (A') a crosslinked (networked) polyethylene polymer made by crosslinking the (A) polyethylene polymer or a combination of the (A) polyethylene polymer and the (K) crosslinking coagent; and the (B) arylketone of formula (I). The crosslinked polyolefin product may further comprise at least one additive selected from (E) an antioxidant; (F) a filler; (G) a flame retardant; (H) a hindered amine stabilizer; (I) a tree retardant; (J) a methyl radical scavenger; (L) a nucleating agent; and (M) a colorant (e.g., carbon black or titanium dioxide). The crosslinked polyolefin product has increased electrical breakdown strength versus that of a crosslinked (A) polyethylene polymer that is free of the (B) arylketone.

Aspect 11. A manufactured article comprising a shaped form of the crosslinkable polyolefin formulation of any one of aspects 1 to 7 or the crosslinked polyolefin product of aspect 10. In some aspects the manufactured article is selected from: a coating, a film, a sheet, an extruded article (not pellets), and an injection molded article. E.g., coated conductors, insulation layers of wire and cables for transmitting electric power or telecommunications, agricultural film, automobile part, container, food packaging, garment bags, grocery bags, heavy-duty sacks, industrial sheeting, pallet and shrink wraps, bags, buckets, freezer containers, lids, toys. The manufactured article has increased electrical breakdown strength versus that of a crosslinked host polyolefin without the (B) arylketone.

Aspect 12. A coated conductor comprising a conductive core and an insulation layer at least partially covering the conductive core, wherein at least a portion of the insulation layer comprises the crosslinkable polyolefin formulation of any one of aspects 1 to 7 or the crosslinked polyolefin product of aspect 11. The coated conductor and its insulation layer have increased electrical breakdown strength. The conductive core may be a wire having proximal and distal ends, at least one end of which may be free of the insulation layer.

Aspect 13. A method of transmitting electricity, the method comprising applying a voltage across the conductive core of the coated conductor of aspect 12 so as to generate a flow of electricity through the conductive core.

Aspect 14. The invention of any one of aspects 1 to 13 wherein the crosslinkable polyolefin formulation has an improvement (increase) in electrical breakdown strength value eta, $\eta$, of at least +5 percent (%) relative to that of the (A) polyethylene polymer that is free of a voltage stabilizer; wherein the electrical breakdown strength values eta, $\eta$, are determined for a failure probability value of 63.2% using Weibull statistics according to the Electrical Breakdown Strength Test Method described in the description. In some embodiments the inventive improvement (increase) in electrical breakdown strength value eta, $\eta$, (for a failure probability value of 63.2%) relative to that of the (A) polyethylene polymer that is free of a voltage stabilizer (e.g., relative to that of Comparative Example 0 (CE0) described later in the Examples) is at least +5%, alternatively at least +25%, alternatively at least +31%, alternatively at least +34%, alternatively at least +38%, alternatively at least 48%, alternatively at least +53%. In some embodiments the inventive improvement in electrical breakdown strength value eta, $\eta$, (for a failure probability value of 63.2%) relative to that of the (A) polyethylene polymer that is free of a voltage stabilizer (e.g., relative to that of CE0) is further characterized as being at most 75%, alternatively at most +65%, alternatively at most +59%, alternatively at most 54%. In some embodiments the inventive improvement in electrical breakdown strength value eta, $\eta$, (for a failure probability value of 63.2%) relative to that of the (A) polyethylene polymer that is free of a voltage stabilizer (e.g., relative to that of CE0) is from +5% to +54%, alternatively from +31% to +54%, alternatively from +34% to +54%, alternatively from +48% to +54%. In some embodiments the inventive improvement in electrical breakdown strength value eta, $\eta$, (for a failure probability value of 63.2%) relative to that of the (A) polyethylene polymer that is free of a voltage stabilizer (e.g., relative to that of CE0) is +38%±5%, alternatively +50%±9%. Alternatively, the inventive improvement in electrical breakdown strength may be any one of the foregoing percentage values relative to eta, $\eta$, (for a failure probability value of 63.2%) of 18.49 (18.5) kV/mm. In some embodiments the crosslinked polyolefin product made from the crosslinkable polyolefin formulation has any one of the aforementioned inventive improvement in electrical breakdown strength value eta, $\eta$, (for a failure probability value of 63.2%). All of the foregoing electrical breakdown strength improvement percentage values eta, $\eta$, (for a failure probability value of 63.2%) are determined according to the Electrical Breakdown Strength Test Method described later. In some embodiments the values eta, $\eta$, (for a failure probability value of 63.2%) are further characterized by a 90% confidence level beta, β, determined according to the Electrical Breakdown Strength Test Method and Weibull Statistics Method described later.

The coated conductor may be a power cable having proximal and distal ends, and the electricity may flow through the conductive core from the proximal end to the distal end, or vice versa. The conductive core may be a wire. The power cable may be a medium-voltage (MV), high-voltage (HV), or extra-high-voltage (EHV) power cable. The power cables are useful in electricity transmitting applications.

The (A) polyethylene polymer. Composed of polyethylene macromolecules that independently comprise at least 5, alternatively from 10 to 200,000 constituent units derived from polymerizing ethylene and zero, one or more other olefin-functional monomers. The (A) polyethylene polymer may have a density of from 0.870 to 0.975 gram per cubic centimeter (g/cm$^3$), alternatively from 0.890 to 0.930 g/cm$^3$ (e.g., LDPE or LLDPE), alternatively from 0.910 to 0.930 g/cm$^3$ (e.g., LDPE or LLDPE), alternatively from 0.931 to 0.945 g/cm$^3$ (e.g., MDPE), alternatively from 0.945 to 0.970 g/cm$^3$ (e.g., HDPE), all measured according to ASTM D792-13, Method B.

The polyethylene may be a homopolymer or a copolymer. The homopolymer is made by polymerizing only ethylene. The copolymer is made by polymerizing at least two different olefin monomers, one of which is ethylene. The copolymer may be a bipolymer made by polymerizing ethylene and one different olefin monomer, a terpolymer made by polymerizing ethylene and two different olefin monomers, or a tetrapolymer made by polymerizing ethylene and three different olefin monomers. The polyolefin that is a copolymer may be a block copolymer or a random copolymer.

Examples of the olefin-functional monomers used to make the (A) polyethylene polymer are ethylene, propene, ($C_4$-$C_{20}$)alpha-olefins, cyclic alkenes (e.g., norbornene), dienes (e.g., 1,3-butadiene), unsaturated carboxylic esters, and olefin-functional hydrolyzable silanes. Examples of the ($C_4$-$C_{20}$)alpha-olefin are a ($C_4$-$C_8$)alpha-olefin such as 1-butene, 1-hexene, or 1-octene; and a ($C_{10}$-$C_{20}$)alpha-olefin. Example of the diene is 1,3-butadiene. Examples of the unsaturated carboxylic esters are alkyl acrylates, alkyl methacrylates, and vinyl carboxylates (e.g., vinyl acetate). Examples of the olefin-functional hydrolyzable silanes are vinyltrialkoxysilanes, vinyltris(dialkylamino)silanes, and vinyl(trioximo)silanes.

In some embodiments the (A) polyethylene polymer is an ethylene-based polymer. An ethylene-based polymer comprises from 51 to 100 wt % of ethylenic units derived from polymerizing ethylene and from 49 to 0 wt % of comonomeric units derived from polymerizing one, alternatively two olefin-functional monomer (comonomer). The comonomer may be selected from propylene, a ($C_4$-$C_{20}$)alpha-olefin, and 1,3-butadiene. The ($C_4$-$C_{20}$)alpha-olefin may be a ($C_4$-$C_8$)alpha-olefin such as 1-butene, 1-hexene, or 1-octene.

Examples of suitable ethylene-based polymers are polyethylene homopolymers, ethylene/($C_4$-$C_{20}$)alpha-olefin copolymers, ethylene/propylene copolymers, ethylene/propylene/diene monomer (EPDM) copolymers such as an ethylene/propylene/1,3-butadiene terpolymer, and ethylene/1-butene/styrene copolymers. Examples of suitable ethylene/($C_4$-$C_{20}$)alpha-olefin copolymers are ethylene/1-butene copolymers, ethylene/1-hexene copolymers, and ethylene/1-octene copolymers. The ethylene-based polymers may be an ultra-low-density polyethylene (ULDPE), very low-density polyethylene (VLDPE), a linear low-density polyethylene (LLDPE), a low-density polyethylene (LDPE), a medium-density polyethylene (MDPE), a high-density polyethylene (HDPE), or an ultra-high-density polyethylene (UHDPE). Many of the ethylene-based polymers are sold by The Dow Chemical Company under trade names like AFFINITY, ATTANE, DOWLEX, ENGAGE, FLEXOMER, or INFUSE. Other ethylene-based polymers are sold by other suppliers under trade names like TAFMER, EXCEED, and EXACT. The LDPE and LLDPE are compositionally different by virtue of how they are made under different polymerization conditions: LDPE is made in a high pressure polymerization reactor in the presence of a free radical initiator (a peroxide or $O_2$) without an olefin polymerization catalyst, whereas LLDPE is made in a standard pressure polymerization reactor in the presence of an olefin polymerization catalyst and in the absence of a free radical initiator.

In some embodiments the (A) polyethylene polymer consist of polymer of only one ethylene-based polymer (e.g., only LLDPE, or only LDPE, or only MDPE, or only HDPE). In some embodiments the (A) polyethylene polymer consists of an LDPE. When the (A) polyethylene polymer consists of an LDPE, in some such embodiments the crosslinkable polyolefin formulation may be free of any organic polymer other than the LDPE.

In other embodiments the (A) polyethylene polymer comprise a blend two or more different ethylene-based polymers. In some embodiments the two or more different ethylene-based polymers of the blend includes a least one LDPE.

The crosslinkable polyolefin formulation may comprise from 60.0 to 99.9 wt % of the (A) polyethylene polymer; alternatively from 70.0 to 99.9 wt % of the (A) polyethylene polymer; alternatively from 80.0 to 99.9 wt % of the (A) polyethylene polymer; alternatively from 90.0 to 99.9 wt % of the (A) polyethylene polymer; all based on total weight of the crosslinkable polyolefin formulation.

In some embodiments of formula (I), (Ia), or (Ib) each of $R^1$ to $R^7$ is H; when the (B) arylketone is of formula (Ia), this is the (B) arylketone of formula (Ia-1) described below; and when the (B) arylketone is of formula (Ib), this is the (B) arylketone of formula (Ib-1) described above. In some embodiments $R^1$ and $R^2$ are bonded together with the carbon atoms in formula (I), (Ia), or (Ib) to which they are bonded to form one fused 6-membered aryl ring and each of the remaining $R^3$ to $R^6$ is H. In some embodiments $R^3$ and $R^4$ are bonded together with the carbon atoms in formula (I), (Ia), or (Ib) to which they are bonded to form one fused 6-membered aryl ring and each of the remaining $R^1$, $R^2$, $R^5$, and $R^6$ is H. In some embodiments $R^4$ and $R^5$ are bonded together with the carbon atoms in formula (I), (Ia), or (Ib) to which they are bonded to form one fused 6-membered aryl ring and each of the remaining $R^1$ to $R^3$ and $R^6$ is H; this is the (B) arylketone of formula (Ia-2) described above. In some embodiments $R^5$ and $R^6$ are bonded together with the carbon atoms in formula (I), (Ia), or (Ib) to which they are bonded to form one fused 6-membered aryl ring and each of the remaining $R^1$ to $R^4$ is H. In some embodiments $R^2$, $R^3$, and $R^4$ are bonded together with the carbon atoms in formula (I), (Ia), or (Ib) to which they are bonded to form two fused 6-membered aryl rings and each of $R^1$ $R^5$, and $R^6$ are H; this is the (B) arylketone of formula (Ia-3) described above.

The crosslinkable polyolefin formulation and crosslinked polyolefin product made therefrom may be free of any voltage stabilizer compound except the (B) arylketone of formula (I).

The crosslinkable polyolefin formulation and crosslinked polyolefin product made therefrom may contain from 0.1 to 3.0 wt % of the (B) arylketone of formula (I); alternatively from 0.2 to 2.0 wt % of the (B) arylketone of formula (I); alternatively from 0.3 to 1.4 wt % of the (B) arylketone of formula (I); alternatively from 0.4 to 1.2 wt % of the (B) arylketone of formula (I); alternatively from 0.45 to 1.04 wt % of the (B) arylketone of formula (I); alternatively 0.5±0.1 wt % of the (B) arylketone of formula (I); alternatively 1.0±0.2 wt % of the (B) arylketone of formula (I); all based on total weight of the crosslinkable polyolefin formulation or total weight of the crosslinked polyolefin product, respectively.

The constituent (C) organic peroxide: a molecule containing carbon atoms, hydrogen atoms, and two or more oxygen atoms, and having at least one —O—O— group, with the proviso that when there are more than one —O—O— group, each —O—O— group is bonded indirectly to another —O—O— group via one or more carbon atoms, or collection of such molecules. The (C) organic peroxide may be added to the crosslinkable polyolefin formulation for curing comprising heating the crosslinkable polyolefin formulation comprising constituents (A), (B), and (C) to a temperature at or above the (C) organic peroxide's decomposition temperature. The (C) organic peroxide may be a monoperoxide of formula $R^O$—O—O—$R^O$, wherein each $R^O$ independently is a ($C_1$-$C_{20}$)alkyl group or ($C_6$-$C_{20}$)aryl group. Each ($C_1$-$C_{20}$)alkyl group independently is unsubstituted or substituted with 1 or 2 ($C_6$-$C_{12}$)aryl groups. Each ($C_6$-$C_{20}$)aryl group is unsubstituted or substituted with 1 to 4 ($C_1$-$C_{10}$)alkyl groups. Alternatively, the (C) may be a diperoxide of formula $R^O$—O—O—R—O—O—$R^O$, wherein R is a divalent hydrocarbon group such as a ($C_2$-$C_{10}$)alkylene, ($C_3$-$C_{10}$)cycloalkylene, or phenylene, and each $R^O$ is as defined above. The (C) organic peroxide may be bis(1,1-dimethylethyl) peroxide; bis(1,1-dimethylpropyl) peroxide; 2,5-dimethyl-2,5-bis(1,1-dimethylethylperoxy) hexane; 2,5-dimethyl-2,5-bis(1,1-dimethylethylperoxy) hexyne; 4,4-bis(1,1-dimethylethylperoxy) valeric acid; butyl ester; 1,1-bis(1,1-dimethylethylperoxy)-3,3,5-trimethylcyclohexane; benzoyl peroxide; tert-butyl peroxybenzoate; di-tert-amyl peroxide ("DTAP"); bis(alpha-t-butyl-peroxyisopropyl) benzene ("BIPB"); isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3,1,1-bis(t-butylperoxy)-3,3,5-trimethylcyclohexane; isopropylcumyl cumylperoxide; butyl 4,4-di(tert-butylperoxy) valerate; or di(isopropylcumyl) peroxide; or dicumyl peroxide. The (C) organic peroxide may be dicumyl peroxide. In some aspects only a blend of two or more (C) organic peroxides is used, e.g., a 20:80 (wt/wt) blend of t-butyl cumyl peroxide and bis(t-butyl peroxy isopropyl)benzene (e.g., LUPEROX D446B, which is commercially available from Arkema). In some aspects at least one, alternatively each (C) organic peroxide contains one —O—O— group. The (C) organic peroxide may be 0.29 to 0.44 wt %, alternatively 0.30 to 39 wt %, alternatively 0.30 to 0.37 wt % of the carrier mixture, alternatively of the crosslinkable polyolefin formulation.

The optional constituent (D) scorch retardant: a molecule that inhibits premature curing, or a collection of such molecules. Examples of a scorch retardant are hindered phenols; semi-hindered phenols; TEMPO; TEMPO derivatives; 1,1-diphenylethylene; 2,4-diphenyl-4-methyl-1-pentene (also known as alpha-methyl styrene dimer or AMSD); and allyl-containing compounds described in U.S. Pat. No. 6,277,925B1, column 2, line 62, to column 3, line 46. In some aspects the crosslinkable polyolefin formulation and crosslinked polyolefin product is free of (D). When present, the (D) scorch retardant may be from 0.01 to 1.5 wt %, alternatively 0.05 to 1.2 wt %, alternatively 0.1 to 1.0 wt % of the crosslinkable polyolefin formulation.

The optional constituent (E) antioxidant: an organic molecule that inhibits oxidation, or a collection of such molecules. The (E) antioxidant functions to provide antioxidizing properties to the crosslinkable polyolefin formulation and/or crosslinked polyolefin product. Examples of suitable (E) are bis(4-(1-methyl-1-phenylethyl)phenyl)amine (e.g., NAUGARD 445); 2,2'-methylene-bis(4-methyl-6-t-butylphenol) (e.g., VANOX MBPC); 2,2'-thiobis(2-t-butyl-5-methylphenol (CAS No. 90-66-4; 4,4'-thiobis(2-t-butyl-5-methylphenol) (also known as 4,4'-thiobis(6-tert-butyl-m-cresol), CAS No. 96-69-5, commercially LOWINOX TBM-6); 2,2'-thiobis(6-t-butyl-4-methylphenol (CAS No. 90-66-4, commercially LOWINOX TBP-6); tris[(4-tert-butyl-3-hydroxy-2,6-dimethylphenyl)methyl]-1,3,5-triazine-2,4,6-trione (e.g., CYANOX 1790); pentaerythritol tetrakis(3-(3,5-bis(1,1-dimethylethyl)-4-hydroxyphenyl)propionate (e.g., IRGANOX 1010, CAS Number 6683-19-8); 3,5-bis(1,1-dimethylethyl)-4-hydroxybenzenepropanoic acid 2,2'-thiodiethanediyl ester (e.g., IRGANOX 1035, CAS Number 41484-35-9); distearyl thiodipropionate ("DSTDP"); dilauryl thiodipropionate (e.g., IRGANOX PS 800); stearyl 3-(3,5-di-t-butyl-4-hydroxyphenyl)propionate (e.g., IRGANOX 1076); 2,4-bis(dodecylthiomethyl)-6-methylphenol (IRGANOX 1726); 4,6-bis(octylthiomethyl)-o-cresol (e.g. IRGANOX 1520); and 2',3-bis[[3-[3,5-di-tert-butyl-4-hydroxyphenyl]propionyl]] propionohydrazide (IRGANOX 1024). In some aspects (E) is 4,4'-thiobis(2-t-butyl-5-methylphenol) (also known as 4,4'-thiobis(6-tert-butyl-m-cresol); 2,2'-thiobis(6-t-butyl-4-methylphenol; tris[(4-tert-butyl-3-hydroxy-2,6-dimethylphenyl)methyl]-1,3,5-triazine-2,4,6-trione; distearyl thiodipropionate; or dilauryl thiodipropionate; or a combination of any two or more thereof. The combination may be tris[(4-tert-butyl-3-hydroxy-2,6-dimethylphenyl)methyl]-1,3,5-triazine-2,4,6-trione and distearyl thiodipropionate. In some aspects the crosslinkable polyolefin formulation and crosslinked polyolefin product is free of (E). When present, the (E) antioxidant may be from 0.01 to 1.5 wt %, alternatively 0.05 to 1.2 wt %, alternatively 0.1 to 1.0 wt % of the crosslinkable polyolefin formulation.

The optional constituent (F) filler: a finely-divided particulate solid or gel that occupies space in, and optionally affects function of, a host material. The (F) filler may be a calcined clay, an organoclays, or a hydrophobized fumed silica such as those commercially available under the CAB-O-SIL trade name from Cabot Corporation. The (F) filler may have flame retarding effects. In some aspects the crosslinkable polyolefin formulation and crosslinked polyolefin product is free of (F). When present, the (F) filler may be 1 to 40 wt %, alternatively 2 to 30 wt %, alternatively 5 to 20 wt % of the crosslinkable polyolefin formulation.

In regard to (F) filler, in some aspects the crosslinkable polyolefin formulation does not contain 20 wt % or more of, alternatively does not contain 15 wt % or more of, alternatively does not contain 10 wt % or more of, alternatively is free of an inorganic filler selected from the group consisting of aluminum oxide, aluminum silicate, calcium silicate, magnesium silicate, silica, titanium dioxide, and mixtures thereof. In some aspects the crosslinkable polyolefin formulation does not contain 20 wt % or more of, alternatively does not contain 15 wt % or more of, alternatively does not contain 10 wt % or more of, alternatively is free of any inorganic filler selected from the group consisting of: solids containing Al, solids containing Ca, solids containing Mg, solids containing Si, solids containing Ti, and mixtures thereof. In some aspects the crosslinkable polyolefin formulation is free of a silsesquioxane, alternatively any siloxane except constituent (B). In some aspects the crosslinkable polyolefin formulation is free of a silsesquioxane and any one of the above-mentioned groups of inorganic fillers. For avoidance of doubt, the term "inorganic filler" does not include carbon black.

The optional constituent (G) flame retardant: a molecule or substance that inhibits combustion, or a collection of such molecules. The (G) may be a halogenated or halogen-free compound. Examples of (G) halogenated (G) flame retardants are organochlorides and organobromides, Examples of the organochlorides are chlorendic acid derivatives and chlorinated paraffins. Examples of the organobromides are decabromodiphenyl ether, decabromodiphenyl ethane, polymeric brominated compounds such as brominated polystyrenes, brominated carbonate oligomers, brominated epoxy oligomers, tetrabromophthalic anhydride, tetrabromobisphenol A and hexabromocyclododecane. Typically, the halogenated (G) flame retardants are used in conjunction with a synergist to enhance their efficiency. The synergist may be antimony trioxide. Examples of the halogen-free (G) flame retardant are inorganic minerals, organic nitrogen intumescent compounds, and phosphorus based intumescent compounds. Examples of the inorganic minerals are aluminum hydroxide and magnesium hydroxide. Examples of the phosphorous-based intumescent compounds are organic phosphonic acids, phosphonates, phosphinates, phosphonites, phosphinites, phosphine oxides, phosphines, phosphites, phosphates, phosphonitrilic chloride, phosphorus ester amides, phosphoric acid amides, phosphonic acid amides, phosphinic acid amides, melamine and melamine derivatives thereof, including melamine polyphosphate, melamine pyrophosphate and melamine cyanurate, and mixtures of two or more of these materials. Examples include phenylbisdodecyl phosphate, phenylbisneopentyl phosphate, phenyl ethylene hydrogen phosphate, phenyl-bis-3,5,5' trimethylhexyl phosphate), ethyldiphenyl phosphate, 2 ethylhexyl di(p-tolyl) phosphate, diphenyl hydrogen phosphate, bis(2-ethyl-hexyl) para-tolylphosphate, tritolyl phosphate, bis(2-ethylhexyl)-phenyl phosphate, tri(nonylphenyl) phosphate, phenylmethyl hydrogen phosphate, di(dodecyl) p-tolyl phosphate, tricresyl phosphate, triphenyl phosphate, triphenyl phosphate, dibutylphenyl phosphate, 2-chloroethyldiphenyl phosphate, p-tolyl bis(2,5,5'-trimethylhexyl) phosphate, 2-ethylhexyldiphenyl phosphate, and diphenyl hydrogen phosphate. Phosphoric acid esters of the type described in U.S. Pat. No. 6,404,971 are examples of phosphorus-based flame retardants. Additional examples include liquid phosphates such as bisphenol A diphosphate (BAPP) (Adeka Palmarole) and/or resorcinol bis(diphenyl phosphate) (Fyroflex RDP) (Supresta, ICI), solid phosphorus such as ammonium polyphosphate (APP), piperazine pyrophosphate and piperazine polyphosphate. Ammonium polyphosphate is often used with flame retardant co-additives, such as melamine derivatives. Also useful is Melafine (DSM) (2,4,6-triamino-1,3,5-triazine; fine grind melamine). In some aspects the crosslinkable polyolefin formulation and crosslinked polyolefin product is free of (G). When present, the (G) may be in a concentration of from 0.01 to 70 wt %, alternatively 0.05 to 40 wt %, alternatively 1 to 20 wt % of the crosslinkable polyolefin formulation.

The optional constituent (H) hindered amine stabilizer: a molecule that contains a basic nitrogen atom that is bonded to at least one sterically bulky organo group and functions as an inhibitor of degradation or decomposition, or a collection of such molecules. The (H) is a compound that has a sterically hindered amino functional group and inhibits oxidative degradation and can also increase the shelf lives of embodiments of the crosslinkable polyolefin formulation that contain (C) organic peroxide. Examples of suitable (H) are butanedioic acid dimethyl ester, polymer with 4-hydroxy-2,2,6,6-tetramethyl-1-piperidine-ethanol (CAS No. 65447-77-0, commercially LOWILITE 62); and N,N'-bis-formyl-N,N'-bis(2,2,6,6-tetramethyl-4-piperidinyl)-hexamethylenediamine (CAS No. 124172-53-8, commercially Uvinul 4050 H). In some aspects the crosslinkable polyolefin formulation and crosslinked polyolefin product is free of (H). When present, the (H) hindered amine stabilizer may be from 0.001 to 1.5 wt %, alternatively 0.002 to 1.2 wt %, alternatively 0.002 to 1.0 wt %, alternatively 0.005 to 0.5 wt %, alternatively 0.01 to 0.2 wt %, alternatively 0.05 to 0.1 wt % of the crosslinkable polyolefin formulation.

The optional constituent (I) tree retardant: a molecule that inhibits water and/or electrical treeing, or a collection of such molecules. The tree retardant may be a water tree retardant or electrical tree retardant. The water tree retardant is a compound that inhibits water treeing, which is a process by which polyolefins degrade when exposed to the combined effects of an electric field and humidity or moisture. The electrical tree retardant, also called a voltage stabilizer, is a compound that inhibits electrical treeing, which is an electrical pre-breakdown process in solid electrical insulation due to partial electrical discharges. Electrical treeing can occur in the absence of water. Water treeing and electrical treeing are problems for electrical cables that contain a coated conductor wherein the coating contains a polyolefin. The (I) may be a poly(ethylene glycol) (PEG). In some aspects the crosslinkable polyolefin formulation and crosslinked polyolefin product is free of (I). When present, the (I) tree retardant may be from 0.01 to 1.5 wt %, alternatively 0.05 to 1.2 wt %, alternatively 0.1 to 1.0 wt % of the crosslinkable polyolefin formulation.

The optional constituent (J) methyl radical scavenger: a molecule that is reactive with methyl radicals, or a collection of such molecules. The (J) react with methyl radicals in the crosslinkable polyolefin formulation or crosslinked polyolefin product. The (J) may be a "TEMPO" derivative of 2,2,6,6-tetramethyl-1-piperidinyl-N-oxyl or a 1,1-diarylethylene. Examples of TEMPO derivatives are 4-acryloxy-2,2,6,6-tetramethyl-1-piperidinyl-N-oxyl (CAS No. 21270-85-9, "acrylate TEMPO"), 4-allyloxy-2,2,6,6-tetramethyl-1-piperidinyl-N-oxyl (CAS No. 217496-13-4, "allyl TEMPO"); bis(2,2,6,6-tetramethyl-1-piperidinyl-N-oxyl) sebacate (CAS No. 2516-92-9, "bis TEMPO")); N,N-bis (acryloyl-4-amino)-2,2,6,6-tetramethyl-1-piperidinyl-N-oxyl (CAS No. 1692896-32-4, "diacrylamide TEMPO"); and N-acryloyl-4-amino-2,2,6,6-tetramethyl-1-piperidinyl-N-oxyl (CAS No. 21270-88-2, "monoacrylamide TEMPO"). Examples of 1,1-diarylethylenes are 1,1-diphenylethylene and alpha-methylstyrene. In some aspects the crosslinkable polyolefin formulation and crosslinked polyolefin product is free of (J). When present, the (J) methyl radical scavenger may be from 0.01 to 1.5 wt %, alternatively 0.05 to 1.2 wt %, alternatively 0.1 to 1.0 wt % of the crosslinkable polyolefin formulation.

The optional constituent (K) crosslinking coagent: a molecule that contains a backbone or ring substructure and one, alternatively two or more propenyl, acrylate, and/or vinyl groups bonded thereto, wherein the substructure is composed of carbon atoms and optionally nitrogen atoms, or a collection of such molecules. The (K) crosslinking coagent is free of silicon atoms. The (K) crosslinking coagent may be a propenyl-functional crosslinking coagent as described by any one of limitations (i) to (v): (i) (K) is 2-allylphenyl allyl ether; 4-isopropenyl-2,6-dimethylphenyl allyl ether; 2,6-dimethyl-4-allylphenyl allyl ether; 2-methoxy-4-allylphenyl allyl ether; 2,2'-diallyl bisphenol A; O,O'-diallyl bisphenol A; or tetramethyl diallylbisphenol A; (ii) (K) is 2,4-diphenyl-4-methyl-1-pentene or 1,3-diisopropenylbenzene; (iii) (K) is triallyl isocyanurate ("TAlC"); triallyl cyanurate ("TAC"); triallyl trimellitate ("TATM"); N,N,N',N',N'',N''-hexaallyl-1,3,5-triazine-2,4,6-triamine ("HATATA"; also known as $N^2,N^2,N^4,N^4,N^6,N^6$_hexaallyl-1,3,5-triazine-2,4,6-triamine); triallyl orthoformate; pentaerythritol triallyl ether; triallyl citrate; or triallyl aconitate; (iv) (K) is a mixture of any two of the propenyl-functional coagents in (i). Alternatively, the (K) may be an acrylate-functional crosslinking coagent selected from trimethylolpropane triacrylate ("TMPTA"), trimethylolpropane trimethylacrylate ("TMPTMA"), ethoxylated bisphenol A dimethacrylate, 1,6-hexanediol diacrylate, pentaerythritol tetraacrylate, dipentaerythritol pentaacrylate, tris(2-hydroxyethyl) isocyanurate triacrylate, and propoxylated glyceryl triacrylate. Alternatively, the (K) may be a vinyl-functional crosslinking coagent selected from polybutadiene having at least 50 wt % 1,2-vinyl content and trivinyl cyclohexane ("TVCH"). Alternatively, the (K) may be a crosslinking coagent described in U.S. Pat. No. 5,346,961 or U.S. Pat. No. 4,018,852. Alternatively, the (K) may be a combination or any two or more of the foregoing crosslinking coagents. In some aspects the crosslinkable polyolefin formulation and crosslinked polyolefin product is free of (K). When present, the (K) crosslinking coagent may be 0.01 to 4.5 wt %, alternatively 0.05 to 2 wt %, alternatively 0.1 to 1 wt %, alternatively 0.2 to 0.5 wt % of the crosslinkable polyolefin formulation.

The optional constituent (L) nucleating agent: an organic or inorganic additive that that enhances the rate of crystallization of a polyolefin polymer. Examples of (L) are calcium carbonate, titanium dioxide, barium sulfate, ultra-high-molecular-weight polyethylene, potassium hydrogen phthalate, benzoic acid compounds, sodium benzoate compounds, disodium bicyclo[2.2.1]heptane-2,3-dicarboxylate, zinc monoglycerolate, and 1,2-cyclohexanedicarboxylic acid, calcium salt:zinc stearate. In some aspects the crosslinkable polyolefin formulation and crosslinked polyolefin product is free of (L). When present, the (L) may be in a concentration of from 0.01 to 1.5 wt %, alternatively 0.05 to 1.2 wt %, alternatively 0.1 to 1.0 wt % of the crosslinkable polyolefin formulation.

The optional constituent (M) colorant (e.g., carbon black or $TiO_2$). Carbon black: a finely-divided form of paracrystalline carbon having a high surface area-to-volume ratio, but lower than that of activated carbon. Examples of carbon black are furnace carbon black, acetylene carbon black, conductive carbons (e.g., carbon fibers, carbon nanotubes, graphene, graphite, and expanded graphite platelets). In some aspects the crosslinkable polyolefin formulation and crosslinked polyolefin product is free of (M). When present, the (M) may be in a concentration of from 0.01 to 40 wt %, alternatively 0.05 to 35 wt %, alternatively 0.1 to 20 wt %, alternatively 0.5 to 10 wt %, alternatively 1 to 5 wt %, of the crosslinkable polyolefin formulation.

In addition the crosslinkable polyolefin formulation may independently further comprise one or more other optional additives selected from a carrier resin, lubricant, processing aid, slip agent, plasticizer, surfactant, extender oil, acid scavenger, and metal deactivator.

The crosslinked polyolefin product may also contain by-products of curing such as alcohol and ketone by-products of the reaction of the (C) organic peroxide. When the crosslinkable polyolefin formulation further contains one or more of any optional additives or constituents such as (E) antioxidant, the crosslinked polyolefin product may also contain the any one or more of the optional additives or constituents such as (E), or one or more reaction products formed therefrom during the curing of the crosslinkable polyolefin formulation. The crosslinked polyolefin product may be in a divided solid form or in continuous form. The divided solid form may comprise granules, pellets, powder, or a combination of any two or more thereof. The continuous form may be a molded part (e.g., injection molded part) or an extruded part (e.g., a coated conductor or a cable).

The coated conductor. The coated conductor may be an insulated electrical conductor. The insulated electrical conductor may be a coated metal wire or an electrical cable, including a power cable for use in low voltage ("LV", >0 to <5 kilovolts (kV)), medium voltage ("MV", 5 to <69 kV), high voltage ("HV", 69 to 230 kV) or extra-high voltage ("EHV", >230 kV) data transmitting and electricity-transmitting/distributing applications. A "wire" means a single strand or filament of conductive material, e.g., conductive metal such as copper or aluminum. A "cable" and "power cable" are synonymous and mean an insulated electrical conductor comprising at least one wire disposed within a covering that may be referred to as a sheath, jacket (protective outer jacket), or coating. The insulated electrical conductor may be designed and constructed for use in medium, high, or extra-high voltage applications. Examples of suitable cable designs are shown in U.S. Pat. Nos. 5,246,783; 6,496,629; and 6,714,707.

The insulated electrical conductor may contain a conductor/transmitter core and an outer single layer covering or an outer multilayer covering disposed therearound so as to protect and insulate the conductor/transmitter core from external environments. The conductor/transmitter core may be composed of one or more metal wires. When the conductor/transmitter core contains two or more metal wires, the metal wires may be sub-divided into discrete wire bundles. Each wire in the conductor/transmitter core, whether bundled or not, may be individually coated with an insulation layer and/or the discrete bundles may be coated with an insulation layer. The single layer covering or multilayer covering (e.g., a single layer or multilayer coating or sheath) primarily functions to protect or insulate the conductor/transmitter core from external environments such as sunlight, water, heat, oxygen, other conductive materials (e.g., to prevent short-circuiting), and/or other corrosive materials (e.g., chemical fumes).

The single layer or multilayer covering from one insulated electrical conductor to the next may be configured differently depending upon their respective intended uses. For example, viewed in cross-section, the multilayer covering of the insulated electrical conductor may be configured sequentially from its innermost layer to its outermost layer with the following components: an inner semiconducting layer, a crosslinked polyolefin insulation layer comprising the crosslinked polyolefin product (inventive crosslinked product), an outer semiconducting layer, a metal shield, and a protective sheath. The layers and sheath are circumferentially and coaxially (longitudinally) continuous. The metal shield (ground) is coaxially continuous, and circumferentially either continuous (a layer) or discontinuous (tape or wire). Depending on the intended application the multilayer covering for the insulated optical fiber may omit the semiconducting layers and/or the metal shield. The outer semiconducting layer, when present, may be composed of a peroxide-crosslinked semiconducting product that is either bonded or strippable from the crosslinked polyolefin layer.

In some aspects is a method of making the coated conductor, the method comprising extruding a coating comprising a layer of the crosslinkable polyolefin formulation onto a conductor/transmitter core to give a coated core, and passing coated core through a continuous vulcanization (CV) apparatus configured with suitable CV conditions for curing the crosslinkable polyolefin formulation to give the coated conductor. CV conditions include temperature, atmosphere (e.g., nitrogen gas), and line speed or passage time period through the CV apparatus. Suitable CV conditions may give a coated conductor exiting the CV apparatus, wherein the coated conductor contains a crosslinked polyolefin layer formed by curing the layer of the crosslinked polyolefin layer.

The method of conducting electricity. The inventive method of conducting electricity may use the inventive coated conductor that comprises the insulated electrical conductor embodiment. Also contemplated is a method of transmitting data using the inventive coated conductor that comprises the insulated electrical conductor.

Electrical breakdown strength (dielectric strength): the maximum electric field (voltage applied divided by electrode separation distance) that an electrically insulative material can withstand without experiencing an electrical breakdown event, i.e., without becoming electrically conductive. Expressed in volts using a standard electrode separation distance.

Any compound, composition, formulation, material, mixture, or reaction product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements that are inherently required by the compound, composition, formulation, material, mixture, or reaction product (e.g., C and H required by a polyethylene, or C, H, and O required by an alcohol) are not omitted.

Alternatively precedes a distinct embodiment. ANSI is the American National Standards Institute organization headquartered in Washington, D.C., USA. ASME is the American Society of Mechanical Engineers, headquartered in New York City, New York, USA. ASTM is the standards organization, ASTM International, West Conshohocken, Pennsylvania, USA. Any comparative example is used for illustration purposes only and shall not be prior art. Free of or lacks means a complete absence of; alternatively not detectable. IEC is International Electrotechnical Commission, 3 rue de Varemb, Case postale 131, CH-1211, Geneva 20, Switzerland, http://www.iec.ch. IUPAC is International Union of Pure and Applied Chemistry (IUPAC Secretariat, Research Triangle Park, North Carolina, USA). Periodic Table of the Elements is the IUPAC version of May 1, 2018. May confers a permitted choice, not an imperative. Operative means functionally capable or effective. Optional(ly) means is absent (or excluded), alternatively is present (or included). Properties may be measured using standard test methods and conditions. Ranges include endpoints, subranges, and whole and/or fractional values subsumed therein, except a range of integers does not include fractional values. Room temperature: 23°±1° C.

Unless stated otherwise, definitions of terms used herein are taken from the IUPAC Compendium of Chemical Technology ("Gold Book") version 2.3.3 dated Feb. 24, 2014.

Density is measured according to ASTM D792-13, *Standard Test Methods for Density and Specific Gravity (Relative Density) of Plastics by Displacement*, Method B (for testing solid plastics in liquids other than water, e.g., in liquid 2-propanol). Report results in units of grams per cubic centimeter (g/cm$^3$ or g/cc).

Melt index ($I_2$) is measured according to ASTM D1238-04 (190° C., 2.16 kg), *Standard Test Method for Melt Flow Rates of Thermoplastics by Extrusion Platometer*, using conditions of 190° C./2.16 kilograms (kg), formerly known as "Condition E" and also known as 12. Report results in units of grams eluted per 10 minutes (g/10 min.) or the equivalent in decigrams per 1.0 minute (dg/1 min.). 10.0 dg=1.00 g.

Inventive embodiments also include the following Electrical Breakdown Strength Test Method. The description of the method is separated for clarity into sections 1 to 3. Section 1 deals with the materials used to prepare a test assembly. Section 2 deals with the procedure for preparing a test plaque representing an insulation layer and preparing the test assembly. The test assembly comprises a sandwich of the test plaque representing an insulation layer and two conductor disks, wherein the test plaque (insulation layer) is disposed between the conductor disks. Section 3 deals with a procedure for applying an increasing test voltage to the test assembly, and detecting an electrical breakdown event in the insulation layer.

Section 1: Electrical Breakdown Strength Test Method (materials): conductors are a plurality of 40 millimeter (mm) diameter aluminum disks and a plurality of 29 mm diameter aluminum disks; wherein each disk 75 microns thick. Sandwich test insulation layer between the conductors so that the total thickness of the sandwich is 350 to 500 microns. After breakdown, remove Al disks and measure thickness of the insulation layer at the location of breakdown.

Section 2: Electrical Breakdown Strength Test Method (procedure for assembling electrodes and test plaques into test assemblies). Prepare samples of test insulation layers in a two-step thermal molding process: step 1: Weigh polymer pellets. Place the weighed pellets in a compression mold (8-inch by 8-inch square compression molding frame, of from about 150 to about 900 microns thickness). Pre-warm the polymer pellets under about 7 pounds per square inch (psi) to 140° C. for 3 minutes. Under the same temperature, switch to high pressure of about 382 psi, and hold for 3 minutes. Under the same pressure, cool down the resulting polymer plaque to room temperature within about 15 minutes. Step 2: Cut a plurality of conductive aluminum (Al) disks of 29 mm and 40 mm diameter out from aluminum sheets of 75 microns thick. Place the conductive Al disks on top and bottom of the plaque (prepared in step 1), with the 29 mm diameter disks on one side and 40-mm diameter disks on the opposite side. The two conductive Al disks are opposing each other and positioned approximately concentric with each other. Position 3-by-3 array of 9 such conductive Al disk pairs, spaced apart on each side of the 8 inch×8 inch polymer plaque. Thermally compress the resulting assembly in the same compression mold and under the same protocol as in step 1. Then place the assembly between two brass electrodes to give the test assembly. Each test assembly has nine pairs of upper and lower brass electrodes, nine pairs of upper and lower conductive Al disks, and a single plaque sandwiched between the nine pairs of upper and lower conductive Al disks.

A portion 1 of the test assembly is shown in FIG. 1. Each test assembly has nine portions 1. Portion 1 of the test assembly includes one of the nine pairs of upper and lower brass electrodes 11 and 15, respectively; one of the nine pairs of upper and lower conductive Al disks 21 and 25, respectively; and a portion of the single plaque 30 (FIG. 1). Each pair of brass electrodes 11 and 15 is in electrical communication with a device (not shown) configured for supplying electrical current, detecting electrical breakdown, and measuring voltage thereat. Such devices are well known, e.g., see ASTM D149-20, *Standard Test Method for Dielectric Breakdown Voltage and Dielectric Strength of Solid Electrical Insulating Materials at Commercial Power Frequencies*; and IEC 243-1, *Methods of Test for Electrical Strength of Solid Insulating Materials Part* 1: *Tests at Power Frequencies*. Brass electrodes 11 and 15 are used to apply the electrical current to its pair of conductive Al disks 21 and 25 respectively. Upper conductive Al disk 21 independently has lower surface 22 and upper surface 23 and its disk thickness is the distance therebetween (i.e., distance from 22 to 23). Lower conductive Al disk 25 independently has lower surface 27 and upper surface 26 and its disk thickness is the distance therebetween (i.e., distance from 26 to 27). Different portions of plaque 30 are sandwiched between spaced-apart and different pairs of conductive Al disks 21 and 25, respectively. The thickness of the plaque 30 between the conductive Al disks 21 and 25 is the distance between the lower surface 22 of upper conductive Al disk 21 and the upper surface 26 of lower conductive Al disk 25. Each portion of plaque 30 independently has upper surface 31. The thickness T of the portion of plaque 30 used in the determination of the electrical breakdown strength in Section 3 below is the distance between the upper surface 26 of lower conductive Al disk 25 and the upper surface 31 of plaque 30. This thickness T is indicated by the "} T" in FIG. 1 and is measured at location of a channel created by the electrical breakdown event referenced in Section 3.

Section 3: Electrical Breakdown Strength Test Method: procedure for applying an alternating electrical current (AC) with increasing test voltage to the test assembly and detecting an electrical breakdown event. Submerge the assembly prepared above in insulation oil and contact same at top and bottom by brass electrodes. Apply voltage. Gradually increase the voltage at a rate of 500 V/S (volts per second, 50 Hz) until a breakdown event takes place, resulting in a channel being created that penetrates through the polymer. A breakdown event is detected as a sudden increase in electrical current. The applied kilovoltage (V) at which this jump in electrical current event occurs is recorded. Such a breakdown event results from a channel being created by the applied voltage in the insulation layer. Thickness of the insulation layer at the location of the channel is measured and used as the insulation thickness in the following calculation of actual breakdown strength $(E_{act})$=V/T wherein V is breakdown voltage in kilovolts (kV) and T is the insulation thickness in millimeters (mm) measured at the channel and $E_{act}$ is actual breakdown strength in kilovolts per millimeter (kV/mm). For reporting purposes in the tables that follow the actual breakdown strength $E_{act}$ is normalized to 1.016 millimeter (mm, equal to 40 mils) thickness and reported as normalized breakdown strength E in kV/mm. The normalized breakdown strength E is calculated according to Equation 1 (Eq. 1): E=(V/T)*(T/T$_0$)^(½) (Eq. 1), wherein ^(½) indicates square root, V is the applied kilovoltage at breakdown event, each T is the measured thickness of the insulation layer (plaque, at the location of breakdown), and T$_0$ is thickness of 1.016 mm (equivalent to 40 mils) such that T/T$_0$ normalizes the breakdown strength value to 1.016 mm thickness. Record the voltage at which electrical breakdown event occurs. Evaluate efficacy of voltage stabilizer by comparing breakdown field strength of the same polymer with and without additive.

In the inventive electrical breakdown strength test method, the voltage at which the electrical breakdown event occurs will vary depending upon thickness of the insulation layer. Analyze the normalized breakdown strength E, having the unit of kV/mm, with well-known two-parameter Weibull statistics according to the Weibull Statistics Method described below.

Weibull Statistics Method. The electrical breakdown strength values for eta, η, and beta, β, are determined for a test sample set of size N by a two-parameter Weibull Statistics Method according to Equation 2

(Eq. 2)

$$F(E) = 1 - e^{-\left(\frac{E}{\eta}\right)^\beta}. \qquad \text{Eq. 2}$$

E is the normalized field strength in kV/mm as determined as described above. F(E) is the cumulative fraction of samples of the sample set that failed at normalized field strength E. To obtain a proper curve fitting, determine F(E) of a set of samples N by calculating the median ranks of each sample of the set according to steps (1) and (2): (1) rank normalized electric field strength, E, at failure in ascending order from 1 to N (for a sample set of size N); (2) using Bernard approximation, determine the median rank (MR) of each sample, i, according to Equation 3: MR=F(E)=(i−0.3)/(N+0.4) (Eq. 3) wherein i ranges from 1 to N (e.g., if N=9, a first sample is i=1, a second sample is i=2, et seq.). In a graph, plot values for cumulative fraction F(E) on a scale from 1 to 99 on the y-axis versus values for normalized field strength E on a scale from 5 to 100 kV/mm (or whatever range is convenient for the values E being plotted) on the x-axis. Knowing cumulative fraction F(E) and E of a set of samples N, perform a curve fitting based on Equation Eq. 2 to obtain the eta, η, and beta, β, values. Eta, η, is equivalent to the field strength whereat 63.2% of the samples have failed. Beta, β, is related to the range of normalized field strength E within which the all (100%) of samples N failed. All other things being equal, the higher the β value, the narrower the range of filed strength within which the test samples N fail. For example, first beta, β, will be higher for a first sample set (N=9) if all samples of the first sample set fail within a range of E 16 kV/mm to E 29 kV/mm (13 kV/mm spread between lowest E 16 kV/mm and highest E 29 kV/mm) than second beta, β, of a second sample set (N=9) wherein all samples of the second sample set fail within a range of E 16 kV/mm to E 30 kV/mm (14 kV/mm spread between lowest E 16 kV/mm and highest E 30 kV/mm).

The electrical breakdown strength value used to determine improvement or diminishment relative to a baseline value for CE0 is the value eta, η, that is a predicted for a failure probability value of 63.2% and is determined from the normalized field strength E values using the Weibull statistics described above. Also reported is the 90% confidence levels (upper and lower) beta, β, value, b, obtained using the Weibull statistics described above. All other things being equal, the higher the β value, the narrower the range of filed strength within which the test samples N fail, and therefore the narrower is the range of E at the 90% confidence level.

All other things being equal, including thickness of the insulation layer, the higher the voltage at which the electrical breakdown strength occurs, the greater the electrical breakdown strength of the insulation material. Determine the percent increase (improvement) or percent decrease (degradation) in voltage of the test plaque (N=8 or 9) at which the electrical breakdown event occurs relative to the voltage of the 17 control plaques (N=153 or 155) at which its electrical breakdown event occurs. The greater the percentage increase, the greater the improvement in electrical breakdown strength. The greater the percentage decrease, the greater the degradation of electrical breakdown strength.

EXAMPLES

Polyethylene polymer (A)-1: a low-density polyethylene homopolymer-1 (LDPE-1). LDPE-1 was premade by polymerizing ethylene in a high pressure reactor in the absence of a metal-based polymerization catalyst and in the presence of a small amount (e.g., 0.3 to 0.4 wt %) of a free radical initiator (e.g., a peroxide or mixture of peroxides or 02) and 1 wt % of a chain transfer agent that is propylene. LDPE-1 has a density 0.920 g/cm$^3$ and a melt index of 2.0 g/10 min.

Inventive arylketone (B)-1: 1-acetonaphthone (i.e., 1-acetylnaphthalene), which is a compound of formula (Ia-1) wherein R$^7$ is methyl.

Inventive arylketone (B)-2: 9-acetylanthracene, which is a compound of formula (Ia-2) wherein R$^7$ is methyl.

Inventive arylketone (B)-3: 1-acetylpyrene, which is a compound of formula (Ia-3) wherein R$^7$ is methyl.

Inventive arylketone (B)-4: 2-acetonaphthone (i.e., 2-acetylnaphthalene), which is a compound of formula (Ib-1) wherein R$^7$ is methyl.

Comparative arylketone 1: 2-actetylfluorene, which has the following structure:

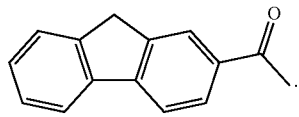 [SMILES: CC(=O)c1ccc2c(c1)Cc1ccccc1-2]

Comparative arylketone 2: benzil, which is a compound having the following structure:

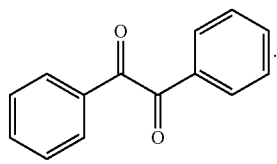 [SMILES: O=C(C(=O)c1ccccc1)c1ccccc1]

Comparative arylketone 3: 4,4'-bis(dimethylamino)-benzil, which is a compound having the following structure:

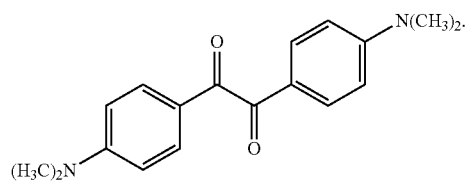

Comparative arylaldehyde 1: 1-pyrenecarboxaldehyde, which is a compound having the following structure:

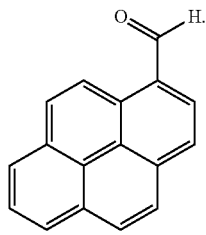

Use to evaluate test compounds, including the (B) arylketone of formula (I) and comparative (non-inventive) ketones, for effects on electrical breakdown strength of crosslinkable polyolefin formulations. Inventive crosslinkable polyolefin formulations comprise a test compound that is the (B) arylketone of formula (I) and the polyethylene polymer (A)-1. Comparative crosslinkable polyolefin formulations comprise a test compound that is a comparative (non-inventive) arylketone, arylaldehyde (or other voltage stabilizer that is not of formula (I)) and the polyethylene polymer (A)-1. Prepare the formulations for testing by melt-compounding a known quantity of test compound into the polyethylene polymer (A)-1 such that the concentration of the test compound in the test formulation is from 0.1 to 3.0 wt % based on total weight of the formulation. Separately fabricate the formulations into test plaques according to the procedure described earlier for the Electrical Breakdown Strength Test Method and determine the voltage at which an electrical breakdown event occurs. Report results as eta value for a failure probability value of 63.2% as determined according to Weibull statistics described above.

Comparative Example 0 (CE0). Prepare a single batch of a stabilizer-free comparative formulation consisting of 100.00 wt % of polyethylene polymer (A)-1. The batch of stabilizer-free comparative formulation is free of a voltage stabilizer or any additive. In separate experiments, melt compound different samples of the stabilizer-free comparative formulation into 17 test plaques. Measure electrical breakdown strength of each test plaque using a 3-by-3 array of nine electrode pairs to obtain 153 actual electrical breakdown strength values. Normalize the electrical breakdown strength values to a plaque thickness of 40 mm according to Eq. 1 described earlier. Normalized electrical breakdown strength value for CE0 is eta, η, value (for a failure probability value of 63.2%) of 18.49 kV/mm with a 90% confidence level, beta, of 18.18 to 18.81 kV/mm (lower limit to higher limit). Compare all comparative and inventive eta, η, values for percent improvement for a failure probability value of 63.2% against the 18.5 kV/mm as the baseline (unimproved or undiminished) normalized electrical breakdown strength value for a failure probability value of 63.2%.

Comparative Examples 1 to 4 (CE1 to CE4): In separate runs, melt compound polyethylene polymer (A)-1 with a known amount of any one of comparative arylketones 1 to 3 or comparative arylaldehyde 4 as shown in Table 1 below to give comparative crosslinkable polyolefin formulations of CE1 to CE4, respectively. Test the formulations according to the Electrical Breakdown Strength Test Method. The test results are shown in Table 2.

TABLE 1 compositions of formulations CE0 and CE1 to CE4. (0 = 0.00)

| Constituent (wt %) | CE0 | CE1 | CE2 | CE3 | CE4 |
|---|---|---|---|---|---|
| Polyethylene Polymer (A)-1 (LDPE-1) | 100 | 99.00 | 99.50 | 99.00 | 99.00 |
| Comparative arylketone 1 (2-acetylfluorene) | 0 | 1 | 0 | 0 | 0 |
| Comparative arylketone 2 (Benzil) | 0 | 0 | 0.5 | 0 | 0 |
| Comparative arylketone 3 (4,4'-bis(dimethylamino)-benzil) | 0 | 0 | 0 | 1 | 0 |
| Comparative arylaldehyde 1 (1-pyrenecarboxaldehyde) | 0 | 0 | 0 | 0 | 1 |
| Total | 100 | 100 | 100 | 100 | 100 |

TABLE 2 electrical breakdown strength test results of formulations CE0 and CE1 to CE4.

| Electrical Breakdown Strength | CE0 | CE1 | CE2 | CE3 | CE4 |
|---|---|---|---|---|---|
| Concentration of comparative voltage stabilizer/destabilizer (wt %) | 0 | 1 | 0.5 | 1 | 1 |
| Number of measurements | 153 | 9 | 9 | 9 | 9 |
| Eta for a failure probability value of 63.2% (kV/mm) | 18.5 | 19.8 | 24.4 | 15 | 19.2 |
| 90% confidence level lower (kV/mm) | 18.2 | N/r | N/r | N/r | N/r |
| 90% confidence level upper (kV/mm) | 18.8 | N/r | N/r | N/r | N/r |
| Percentage increase in voltage (improvement, +%) or percentage decrease in voltage (degradation, −%) relative to voltage of CE0 | 0% | +7% | +32% | −17% | +4% |

N/r is not reported. As indicated by the data in Table 2, relative to CE0, which does not contain an additive that is a voltage stabilizer, benzil (CE2) and 1-pyrenecarboxaldehyde (CE4) improved or slightly improved, respectively, (increased voltage) electrical breakdown strength, whereas 2-acetylfluorene (CE1) did not change electrical breakdown strength, and 4,4'-bis(dimethylamino)-benzil (CE3) degraded (decreased voltage) electrical breakdown strength.

Inventive Example 1 (IE1, prophetic): melt compound polyethylene polymer (A)-1 with from 0.1 to 3.0 wt % of arylketone (B)-1 (1-acetonaphthone) to give inventive crosslinkable polyolefin formulation IE1, wherein wt % is based on total weight of the formulation IE1.

Inventive Examples 2 to 7 (IE2 to IE7): In separate runs, melt compound polyethylene polymer (A)-1 with a known amount of any one of arylketone (B)-2, (B)-3, or (B)-4 according to Table 3 below to give inventive crosslinkable polyolefin formulations of IE2 to IE7. Test the formulations according to the Electrical Breakdown Strength Test Method. The test results are shown in Table 4.

TABLE 3 compositions of formulations IE2 to IE7. (0 = 0.00)

| Constituent (weight parts) | IE2 | IE3 | IE4 | IE5 | IE6 | IE7 |
|---|---|---|---|---|---|---|
| Polyethylene Polymer (A)-1 (LDPE-1) | 99.50 | 99.00 | 99.50 | 99.00 | 99.50 | 99.00 |
| Arylketone (B)-2 (9-acetylanthracene) | 0.5 | 1 | 0 | 0 | 0 | 0 |
| Arylketone (B)-3 (1-acetylpyrene) | 0 | 0 | 0.5 | 1 | 0 | 0 |
| Arylketone (B)-4 (2-acetonaphthone) | 0 | 0 | 0 | 0 | 0.5 | 1 |
| Total | 100 | 100 | 100 | 100 | 100 | 100 |

The data in Table 3 indicates that the crosslinkable polyolefin formulations of IE2 to IE7 are examples of the inventive crosslinkable polyolefin formulation.

TABLE 4 electrical breakdown strength test results of formulations IE2 to IE7.

| Electrical Breakdown Strength | CE0 | IE2 | IE3 | IE4 | IE5 | IE6 | IE7 |
|---|---|---|---|---|---|---|---|
| Concentration of arylketone (wt %) | 0 | 0.5 | 1 | 0.5 | 1 | 0.5 | 1 |
| Number of measurements | 153 | 9 | 9 | 9 | 9 | 18 | 18 |
| Eta for a failure probability value of 63.2% (kV/mm) | 18.5 | 25.6 | 28.3 | 19.4 | 24.8 | 24.2 | 27.6 |
| 90% confidence level lower (kV/mm) | 18.2 | 24.2 | 27.0 | 18.9 | 23.0 | 23.2 | 26.4 |
| 90% confidence level upper (kV/mm) | 18.8 | 27.1 | 29.4 | 19.8 | 26.5 | 25.1 | 28.7 |

TABLE 4-continued electrical breakdown strength test results of formulations IE2 to IE7.

| | Electrical Breakdown Strength | | | | | | |
|---|---|---|---|---|---|---|---|
| | CE0 | IE2 | IE3 | IE4 | IE5 | IE6 | IE7 |
| Percentage increase in voltage (improvement, +%) or percentage decrease in voltage (degradation, -%) relative to voltage of CE0 | 0% | +38% | +53% | +5% | +34% | +31% | +48% |

As indicated by the data in Table 4, relative to CE0, which does not contain an additive that is a voltage stabilizer, all inventive arylketones of formula (I) improved (increased voltage) electrical breakdown strength. Further, comparing IE2 with IE3, IE4 with IE5 and comparing IE6 with IE7, the improvement in electrical breakdown strength positively correlated to concentration of the arylketone in the formulation.

Inventive Example 8 (IE8, prophetic): melt compound polyethylene polymer (A)-1 with 2.5 wt % of arylketone (B)-1 (1-acetonaphthone) to give a first inventive crosslinkable polyolefin formulation. Soak 1.0 wt % dicumyl peroxide thereinto to give a second inventive crosslinkable polyolefin formulation of IE8. Wt % are based on total weight of the formulation of IE8. Heat the resulting inventive formulation at 120° C. for 1 hour, thereby making an inventive crosslinked polyolefin product of IE8.

Inventive Examples 9 to 13 (IE9 to IE13, prophetic): In separate runs, replicate the procedure of IE8 except use in place of arylketone (B)-1 the same amount of any one of arylketone (B)-2, (B)-3, or (B)-4 to give inventive crosslinked polyolefin products of IE9 to IE13.

The invention claimed is:

1. A coated conductor comprising a conductive core and an insulation layer at least partially covering the conductive core, wherein at least a portion of the insulation layer comprises a crosslinkable polyolefin formulation comprising (A) a polyethylene polymer and (B) an arylketone of formula (1a-3):

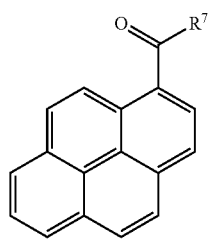

(1a-3)

wherein $R^7$ is an unsubstituted $(C_1-C_5)$alkyl group or an unsubstituted $(C_6-C_{40})$alkyl group; wherein the (A) polyethylene polymer comprises from 51 to 100 weight percent (wt %) ethylene-derived constituent units and from 49 to 0 wt %, respectively, of alpha-olefin-derived constituent units, based on weight of the (A) polyethylene polymer; and wherein the crosslinkable polyolefin formulation comprises from 30.0 to 99.9 wt % of the (A) polyethylene polymer based on total weight of the crosslinkable polyolefin formulation and from 0.1 to 3.0 wt % of the (B) arylketone based on total weight of the crosslinkable polyolefin formulation.

2. The coated conductor of claim 1 wherein the (A) polyethylene polymer comprises 100 wt % of ethylene-derived constituent units and is (A1) a low-density polyethylene homopolymer; or wherein the (A) polyethylene polymer comprises from 51 to 99.9 wt % ethylene-derived constituent units and from 49 to 0.1 wt % alpha-olefin-derived constituent units and is (A2) an ethylene/alpha-olefin copolymer.

3. The coated conductor of claim 1 further comprising at least one additive wherein each additive is independently selected from the group consisting of: (C) an organic peroxide; (D) an anti-scorch agent; (E) an antioxidant; (F) a filler; (G) a flame retardant; (H) a hindered amine stabilizer; (I) a tree retardant; (J) a methyl radical scavenger; (K) a crosslinking coagent; (L) a nucleating agent; (M) a colorant; and a combination of any two or more of additives (C) to (M).

4. A cured coated conductor comprising a conductive core and an insulation layer at least partially covering the conductive core, wherein at least a portion of the insulation layer comprises a crosslinked polyolefin product, wherein the cured coated conductor is made by a method comprising subjecting the coated conductor of claim 1 to a curing condition in such a way so as to crosslink the (A) polyethylene polymer, thereby making the crosslinked polyolefin product.

5. A method of transmitting electricity, the method comprising applying a voltage across the conductive core of the coated conductor of claim 4 so as to generate a flow of electricity through the conductive core.

6. The coated conductor of claim 1 wherein the crosslinkable polyolefin formulation has an improvement (increase) in electrical breakdown strength value eta, η, of at least +5 percent (%) relative to that of the (A) polyethylene polymer that is free of a voltage stabilizer; wherein the electrical breakdown strength values eta, η, are determined for a failure probability value of 63.2% using Weibull statistics according to the Electrical Breakdown Strength Test Method and Weibull Statistics Method described in the description.

* * * * *